US005253334A

United States Patent [19]

Kimura et al.

[11] Patent Number: 5,253,334

[45] Date of Patent: Oct. 12, 1993

[54] TAPE PRINTER

[75] Inventors: Satoshi Kimura, Ome; Nobuyuki Mochinaga, Hachiouji, both of Japan

[73] Assignee: Casio Computer Co., Ltd., Tokyo, Japan

[21] Appl. No.: 14,097

[22] Filed: Feb. 5, 1993

Related U.S. Application Data

[63] Continuation of Ser. No. 820,574, Jan. 14, 1992.

[30] Foreign Application Priority Data

Jan. 31, 1991 [JP] Japan ................................ 3-029080
Aug. 30, 1991 [JP] Japan ............................ 3-069501[U]
Aug. 30, 1991 [JP] Japan ................................ 3-220189

[51] Int. Cl.[5] ............................................ G06K 15/00

[52] U.S. Cl. .................................. 395/102; 400/586; 346/134

[58] Field of Search ............... 395/101, 102, 105, 112, 395/117, 110; 346/1.1, 154, 157, 134, 136, 135.1; 355/308, 309, 311; 400/133, 586, 587

[56] References Cited

U.S. PATENT DOCUMENTS 3,803,628 4/1974 Van Brimer et al. .................. 346/1
4,569,584 2/1986 St. John et al. ..................... 346/157
4,814,893 3/1989 Katoh ................................. 358/309
4,927,278 5/1990 Kuzuya et al. ...................... 395/102
4,965,590 10/1990 Yamazaki ........................... 346/136
4,966,476 10/1990 Kuzuya et al. ...................... 395/102
4,976,558 12/1990 Kuzuya et al. ...................... 395/102
4,983,058 1/1991 Nagae ................................. 395/102
5,009,530 4/1991 Kuzuya et al. ...................... 395/102

FOREIGN PATENT DOCUMENTS

0322918A2 7/1989 European Pat. Off. .
0449465A2 10/1991 European Pat. Off. .
0451830A2 10/1991 European Pat. Off. .
1-173381 7/1989 Japan .

OTHER PUBLICATIONS

Patent Abstracts of Japan vol. 13, No. 452 (P-943) Oct. 12, 1989.

Research Disclosure No. 286, Feb. 1988, New York, USA p. 77 "Ribbon Cartridge Detection".

*Primary Examiner*—Arthur G. Evans
*Attorney, Agent, or Firm*—Frishauf, Holtz, Goodman & Woodward

[57] ABSTRACT

A tape printer unit comprises a housing, a printer unit provided in the housing, a keyboard on the housing, and a cassette accommodating an adhesive tape and ink ribbon the cassette being removablely attached in the printer unit. The tape printer unit prints data input from the keyboard on the adhesive tape, and feeds the printed adhesive tape to the outside of the housing. The tape printer unit is capable of being used with several different cassettes respectively accommodating adhesive tapes which are of different width from each other, and can automatically print the data according to the width of the adhesive tape accommodated in the cassette which has been attached in the printer unit.

15 Claims, 10 Drawing Sheets

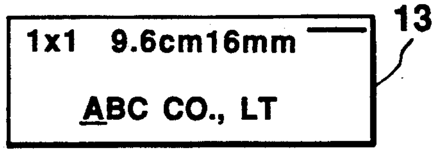
FIG.10A
FIG.11A
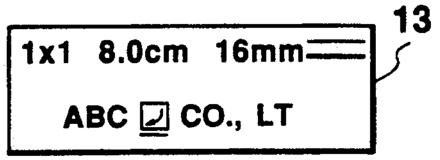
FIG.10B
FIG.11B
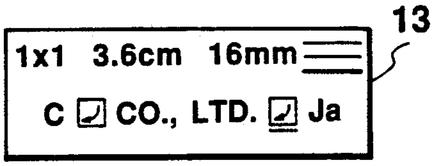
FIG.10C
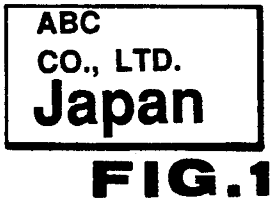
FIG.11C
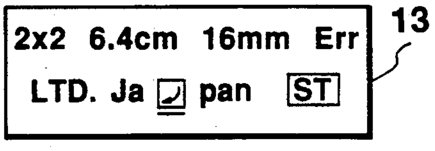
FIG.10D
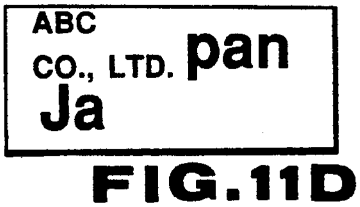
FIG.11D
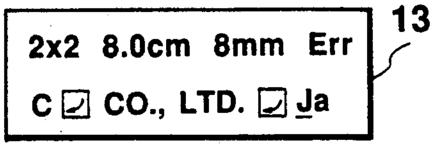
FIG.10E
FIG.11E
FIG.13A
FIG.13B
FIG.13C
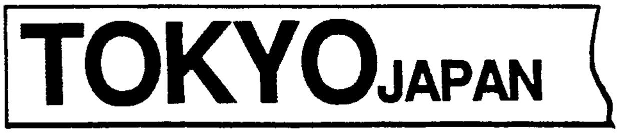

TAPE PRINTER

This application is a continuation of application Ser. No. 07/820,574, filed Jan. 14, 1992.

BACKGROUND OF THE INVENTION

1. Field of the Invention

The present invention relates to a tape printer for printing data on an adhesive tape attached therein and for feeding out the printed adhesive tape to the outside thereof.

2. Related Art

Tape printers capable of printing data on an adhesive tape have been practically put to use. In general, such a tape printer prints data on an adhesive tape which is provided in a cassette loaded into the tape printer and feeds out the printed adhesive tape to the outside thereof.

The tape printer must be constituted so that adhesive tapes having different widths may be used for printing data, in order to comply with various user's demands.

However, it is probable that a tape printer having such a constitution may produce printing errors where the data is printed out of the boundaries of the adhesive tape when the printing size of data to be printed is wider than the width of the adhesive tape. That is, it is possible for the user to designate a printing size wider than the width of the adhesive tape, since the printing size is capable of being designated up to a size corresponding to the widest adhesive tape.

If such a printing error occurs, a printing head is negatively influenced, since the printing head performs the printing operation on not only the adhesive tape, but also out of the adhesive tape. That is, the printing head is damaged, since the printing head carries out the printing operation on no object to be printed. Therefore, in the prior art, highly cumbersome operations are required for designating a proper printing size every time the adhesive tape is changed. Moreover, it is usually difficult to determine whether or not a printing error will occur until after the printing operation is carried out.

SUMMARY OF THE INVENTION

The present invention has been made in consideration of the above-described drawbacks inherent to the conventional tape printer, and has as an object to provide a tape printer wherein printing errors of the type where data is printed out of the boundaries of the adhesive tape, are previously prevented without first carrying out the printing operation, regardless of the width of the adhesive tapes being used.

According to the present invention, a tape printer comprises a housing; data input means for inputting data; printing means provided in said housing, for printing the data input from said input means; a tape member capable of being mounted in said housing, said tape member having a given width, for having the input data printed thereon by said printing means; tape-width detecting means provided in said housing, for detecting the tape-width of said tape member mounted in said housing; and printing control means for controlling the printing operation of said printing means based on the tape-width detected by said tape-width detecting means, so that said printing means prints the data in an area corresponding to the width of said tape member mounted in said housing.

Since the tape printer with the above-described arrangement according to the present invention can inhibit the printing of data outside the side boundaries of the adhesive tape, there is a particular advantage that the printing head is not damaged or negatively influenced by printing off of the adhesive tape without requiring highly cumbersome operations for the user.

BRIEF DESCRIPTION OF THE DRAWINGS

FIGS. 10A–10E show a display of data obtained by the processing operations explained with reference to FIG. 9;

FIGS 11A–11E show printed data on an adhesive tape when a display unit displays data shown in FIGS. 10A–10E, respectively;

FIGS. 13A–13C show printed data on respective adhesive tapes of different width, obtained by the processing operations explained in FIG. 12.

DETAILED DESCRIPTION

An embodiment of the present invention will now be described, with reference to the drawings attached hereto.

Figure 1:
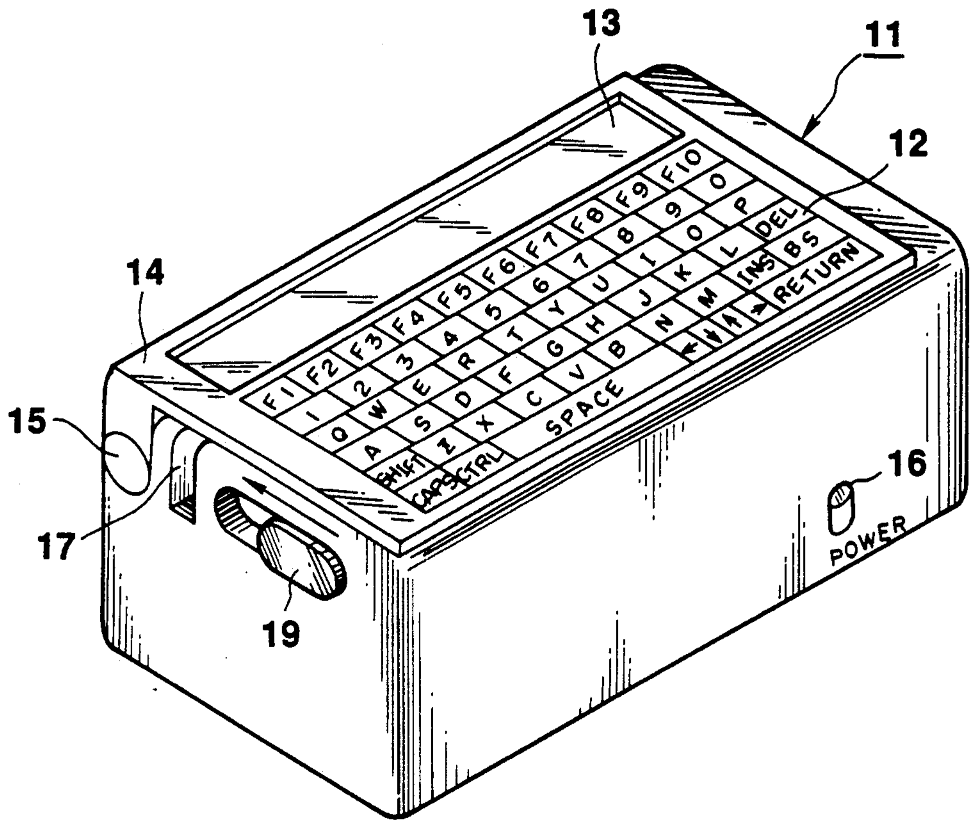
FIG. 1 is a perspective view of a tape printer according to a preferred embodiment of the invention.
Figure 2:
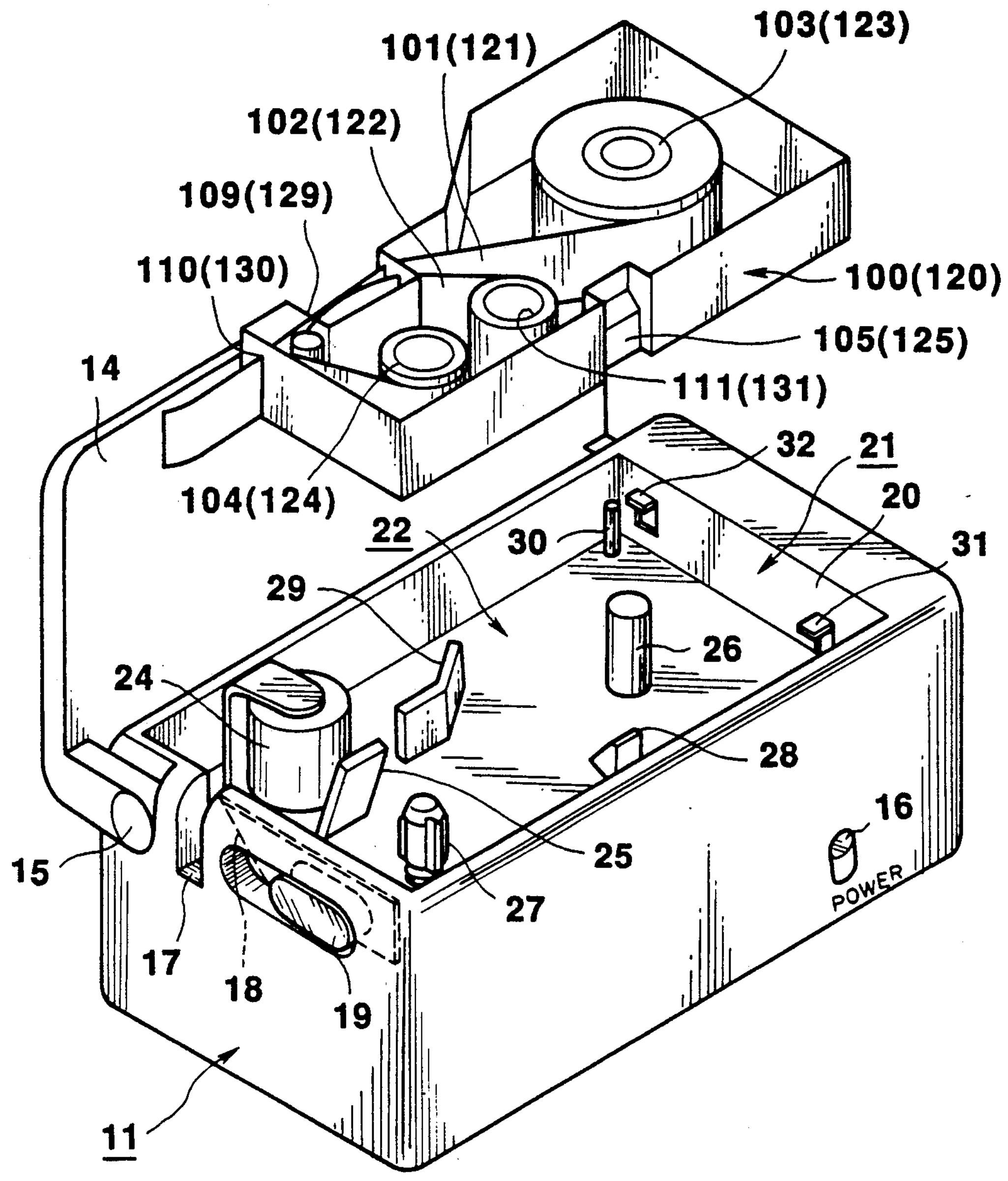
FIG. 2 is a perspective view of the tape printer illustrated in FIG. 1, with the top cover opened.

FIGS. 1 and 2 are perspective views of a tape printer according to an embodiment of the present invention. The tape printer has a case 11 which is in the form of a rectangular box and which is small enough to be held by hand, e.g. the case 11 may be 120 mm deep, 190 mm wide and 60 mm high. A top cover 14 is pivotally connected to the upper portion of the case 11 by a hinge assembly 15. A keyboard 12 and a display unit 13 are mounted on the upper surface of the top cover 14.

The keyboard 12 comprises a plurality of alphanumeric keys and function keys and is employed so as to input desired data and to set the printer in several different printing modes, or the like. The display unit 13 comprises a liquid-crystal display panel and displays data inputted from the keyboard 12 or the like.

The case 11 has a power switch 16 on the front surface thereof and an outlet 17 for an adhesive tape 101 (121) (described in more detail below), and a slider member 19 for manually moving a cutter 18 to cut the adhesive tape 101 (121) on the left side surface thereof.

As shown in FIG. 2, a printer section 21 is provided in the upper portion of the case 11. The printer section 21 is usually covered by the top cover 14 and is exposed by opening the top cover 14 (as in FIG. 2). The printer section 21 comprises a printer unit 22. The printer unit 22 is mounted in a opening 20 provided at the top of the case 11. The printer unit 22 is capable of loading a tape cassette 100 (120) and prints data on the adhesive tape 101 (121) provided in the cassette 100 (120).

Figure 3:
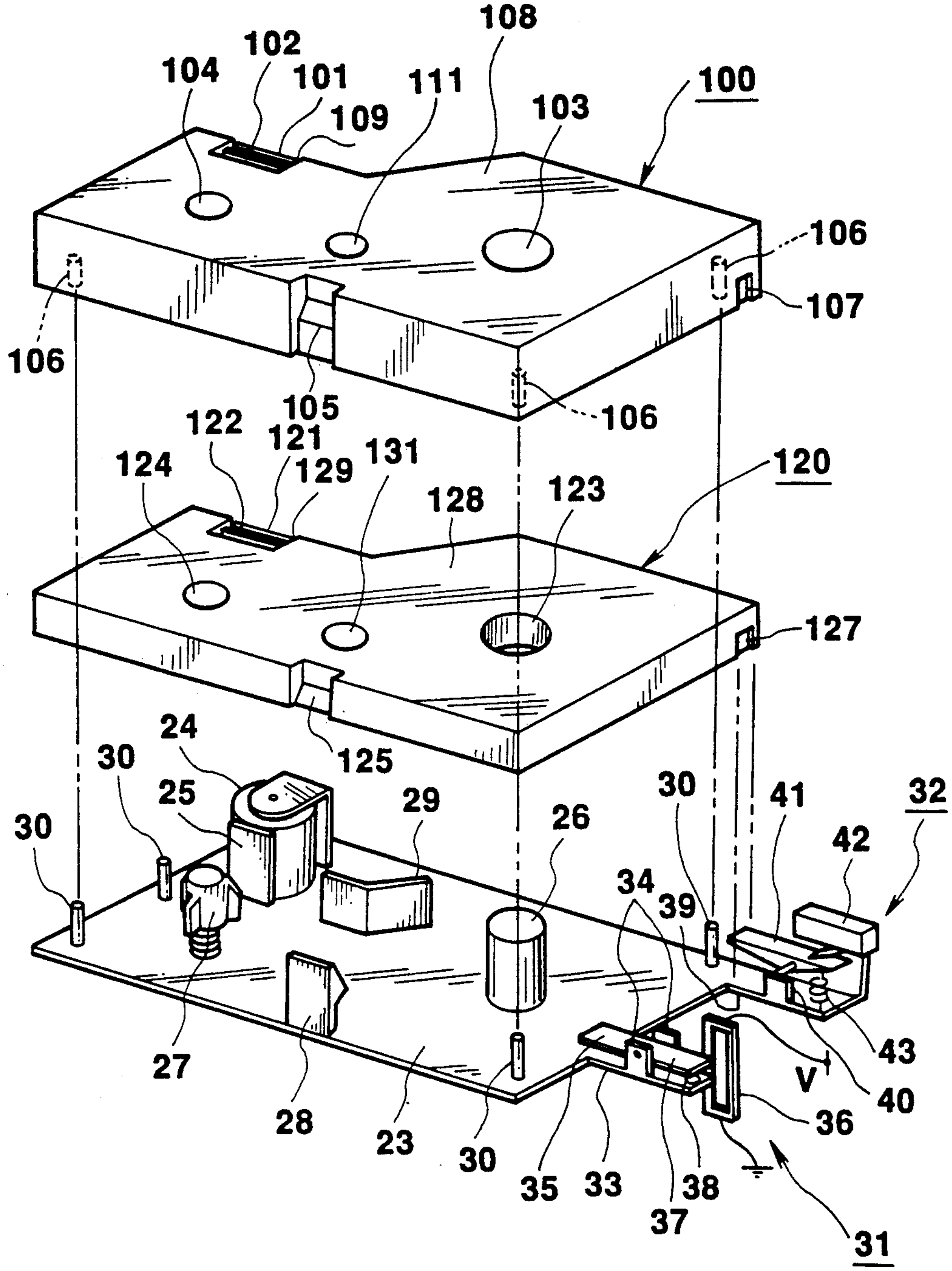
FIG. 3 is a perspective exploded view of a printer section of the tape printer illustrated in FIGS. 1 and 2.
Figure 4A:
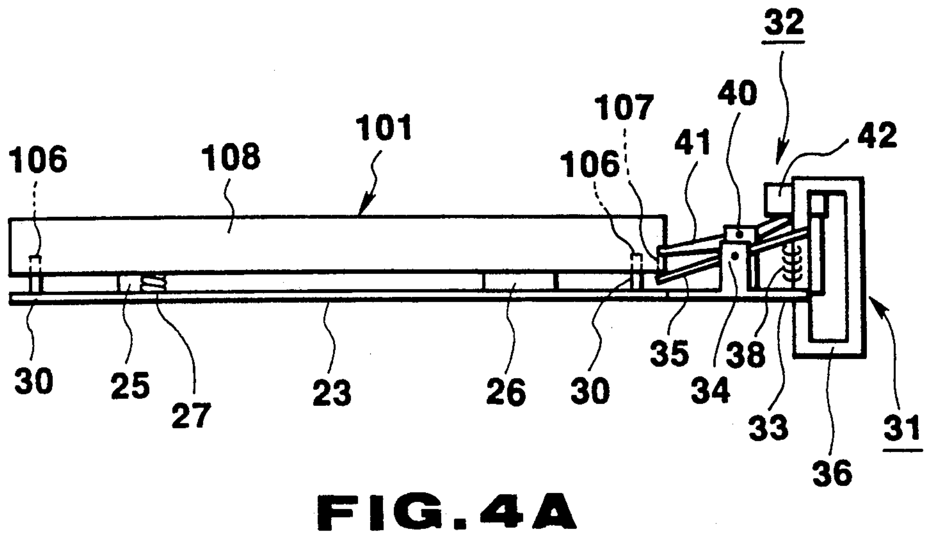
FIGS. 4A and 4B are front views of the printer section shown in FIG. 3 and loading a tape cassette.
Figure 4B:
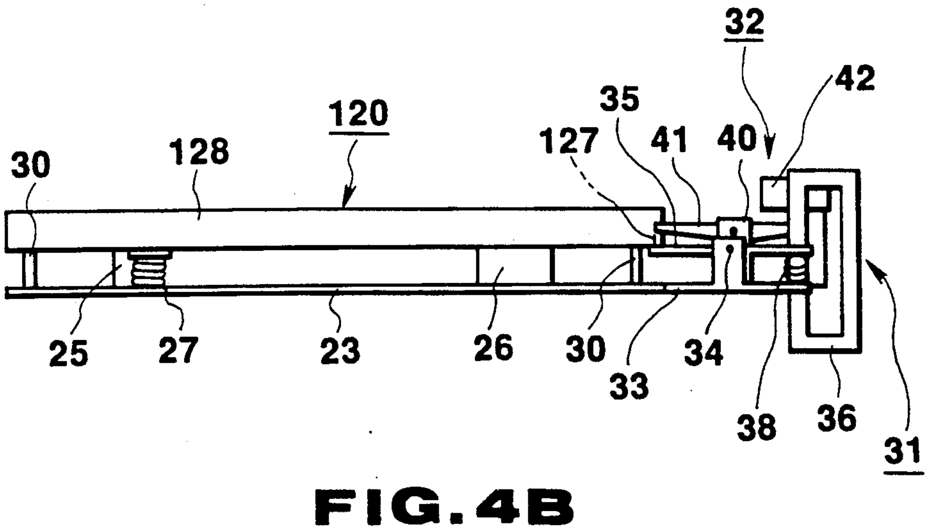

As shown in FIG. 3, the printer unit 22 comprises a chassis 23 mounted on the lower portion of the opening 20 of the case 11. The chassis 23 has a platen roller 24 and a thermal head 25 mounted thereon, which are disposed adjacent to the outlet 17 (see FIG. 2) of the case 11.

The platen roller 24 is rotatably mounted on chassis 23 and is rotated by a motor 58 (shown in FIG. 5 and described in more detail below) mounted in the case 11. The platen roller 24 transfers the adhesive tape 101 (121) and an ink ribbon 102 (122) provided in the tape cassette 100 (120) which is loaded in the printer unit 22 and makes the adhesive tape 101 (121) feed out from the outlet 17 to the outside of the case 11.

The thermal head 25 can print data up to 128 mm wide and comprises 128 heating elements (shown in FIG. 8) regularly spaced apart (8 elements/mm) along the axis of the platen roller 24. The thermal head 25 is movably mounted to the chassis 23, so as to be movable between a position in which the thermal head 25 keeps in contact with the platen roller 24 (FIG. 3) and a position in which the thermal head 25 is spaced from the platen roller 24 (FIG. 2).

The chassis 23 also has a reel guide 26 and a ribbon take-up shaft 27 mounted thereon. The reel guide 26 is inserted into a tape feed reel 103 (123) provided in the tape cassette 100 (120) when the tape cassette 100 (120) is loaded in the printer unit 22.

The ribbon take-up shaft 27 is rotatably mounted on the chassis 23 and is rotated by the motor 58 (FIG. 5) with a predetermined torque. The ribbon take-up shaft 27 is inserted in a ribbon take-up spool 104 (124) provided in the tape cassette 100 (120) when the cassette 100 (120) is loaded in the printer unit 22, and rotates the takes-up spool 104 (124) for taking up the ink ribbon 102 (122) around the take-up spool 104 (124).

A cassette fixing piece 28, a cassette guide plate 29 and height adjust pins 30 are mounted on the chassis 23, so as to fix the cassette 100 (120) on the chassis 23.

The cassette fixing piece or guide member 28 snaps into a fixing hollow 105 (125) formed on the cassette 100 (120) when the cassette 100 (120) is loaded in the printer unit 22. The cassette guide plate 29 keeps in contact with the surface of the side which opposes the fixing hollow 105 (125) of the cassette 100 (120) when the cassette 100 (120) is loaded into the printer unit 22. The height adjust pins 30 are mounted at positions corresponding to the corner of the cassette 100 (120), on the chassis 23. The height adjust pins 30 are inserted in height adjust holes 106 (FIG. 3) or keep in contact with the lower surface of the cassette 120, for adjusting the upper position of the cassette 100 (120) at a predetermined level even though the cassettes 100 (120) having different thicknesses may be loaded.

As shown in FIG. 2, a tape-width detecting unit 31 and an ink-material detecting unit 32 are also attached to the chassis 23. As shown in detail in FIG. 3, the tape-width detecting unit 31 comprises a movable plate 35 and a resistor plate 36. The movable plate 35 is rotatably supported to supporting plates 34 extending upwardly from a horizontal projection 33 of the chassis 23, at substantially the center of projection 33. The movable plate 35 is made of electrically conductive material, e.g., metal, and is electrically connected to a lead 37 for detecting a voltage. A coil spring 38 is provided between one end of the movable plate 35 and the projection 33 for biasing the one end of the movable plate 35 downwardly. The resistor plate 36 is connected to a predetermined voltage source at one end thereof, and is connected to ground at another end thereof. The resistor plate 36 abuts the side adjacent to one end of the movable plate 35. When the cassette 100 (120) is loaded in the printer unit 22, the movable plate 35 is rotated against the force of the coil spring 38 by movement of a lower surface of the cassette 100 (120) keeping in contact with another end of the movable plate 35, and has its position changed along the resistor plate 36 abutting the side of the movable plate 35. The lead 37, connected to plate 35, outputs a voltage according to the position of the resistor plate 36 abutting the side of the movable plate 35. Hence the tape-width detecting unit 31 outputs a voltage according to the thickness of the cassette 100 (120); that is, according to the width of the adhesive tape 101 (121) provided in the cassette 100 (120) which is loaded in the printer unit 22.

The ink-material detecting unit 32 comprises a movable plate 41 and a microswitch 42 as seen in FIG. 3. The movable plate 41 is rotatably supported to supporting plates 40 extending upwardly from a projection 39 of the chassis 23, at center thereof. The microswitch 42 is turned on or off by movement of one end of the movable plate 41. A coil spring 43 is provided between said one end of the movable plate 41 and the projection 39 and biases said one end of the movable plate 41 downwardly for keeping the microswitch 42 turned off. When the cassette is loaded in the printer unit 22, the movable plate 41 is inserted into a groove 107 (127) cut from lower surface of the cassette 100 (120) to the upper portion of the cassette 100 (120). The upper portion of the groove 107 (127) is determined according to each ink material of the ink ribbon 102 (122). When the cassette 100 (120) provides an ink ribbon 102 (122) having high melting point, the movable plate 41 is kept in contact with the upper portion of the groove 107 (127) and is rotated. Therefore, the movable plate 41 causes the microswitch 42 to turn on. On the other hand, when the cassette 100 (120) provides an ink ribbon 102 (122) having low melting point, the movable plate 41 does not contact with upper portion of the groove 107 (127) and is not rotated. Therefore, the microswitch 42 is kept turned off. Hence the ink-material detecting unit 32 detects the ink material of the ink ribbon 102 (122) provided in the cassette 100 (120) by detecting the position of the upper portion of the groove 107 (127).

The tape cassettes 100 and 120 will now be described in greater detail. The tape cassettes 100 and 120 accommodate the adhesive tapes 101 and 121 and the ink ribbons 102 and 122, respectively. The cassette 100 accommodates an adhesive tape which is 10 mm or 16 mm wide, and the ink ribbon 102 having a high melting point ink. However, a cassette 100 having a 16 mm wide adhesive tape therein is thicker than a cassette having a 10 mm wide adhesive tape therein. The cassette 120 accommodates an 8 mm wide adhesive tape 121, and the ink ribbon 122 having a low melting point ink. The adhesive tapes 101 and 121 comprise a tape made of paper or plastic sheet, an adhesive coated on one side of the tape and a separable release sheet adhered on the side of the tape which is coated with the adhesive. The ink ribbons 102 and 122 comprises a base sheet and an ink made of heat melting ink coated on one side of the base sheet. The ink is transferred from the base sheet to object which is printed by means of the thermal head 25. The cassettes 100 and 120 respectively comprise cassette cases 108 and 128, tape feed reels 103 and 123, ribbon take-up spools 104 and 124 and ribbon feed spools 111 and 131. The tape feed reels 103 and 123, the ribbon take-up spools 104 and 124 and the ribbon feed spools 111 and 131 are rotatably mounted in the cassette cases 108 and 128, respectively. The cassette cases 108 and 128 comprise the aforementioned fixing hollows 105 and 125 on the rear surfaces thereof, the grooves 107 and 127 on the one side surface thereof, head insert portions 109 and 119 and tape outlets 110 and 130, respectively. The head insert portions 109 and 119 are located at the portion corresponding to portion of the thermal head 25 when the cassettes 100 and 120 are respectively loaded into the printer unit 22. The tape outlets 110 and 120 are located at the portion corresponding to the position of the outlet 17 of the case 11 when the cassettes 100 and 120 are respectively loaded into the printer unit 22.

The adhesive tapes 101 and 121 are wound around the tape feed or supply reels 103 and 123 and are extended from the tape feed reels 103 and 123 to the tape outlets 110 and 130 via the head insert portions 109 and 129, respectively. The ink ribbons 102 and 122 are wound around the ribbon feed or supply spools 111 and 131 and are taken up by the ribbon take-up spools 104 and 124 via the head insert portions 109 and 129. The ink ribbons 102 and 122 are located between the printing head 25 and the adhesive tapes 101 and 121 at the head insert portions 109 and 129, after the cassette 100 (120) is loaded into the printer unit 22.

The height adjust holes 106 (FIG. 3) are opened at the corners of the cassette case 108 and have predetermined depth according to thickness of the cassette case 108. The case 128 of cassette 120 does not have opened height adjust holes, because the cassette case 128 is the thinnest case among the cassette cases which can be used with the tape printer. Therefore, in the case of the cassette case 128, the height adjust pins 30 mounted on chassis 23 contact with the lower surface of the case 128 of the cassette 120.

The grooves or cut-outs 107 and 127 extend upwardly from lower surfaces of the cassette cases 108 and 128, and are located at portions corresponding to portion of the movable plate 41 of the ink-material detecting unit 32 when the cassettes 100 and 120 are loaded. The distances between the upper ends of the grooves 107 and 127 and the upper surfaces of the respective cassette cases 108 and 128, are determined based on the type of ink material accommodated in the cassettes 100 and 120. Such distance of the cassette 100 is longer than that of the cassette 120. That is, in the case of the high melting point ink provided in the cassette 100 such distance is determined to be longer so that the movable plate 41 of the ink-material detecting unit 32 is kept in contact with the upper portion or end of the groove 107 and is rotated. On the other hand, in the case of a low melting point ink provided in the cassette 120, such distance is determined to be shorter so that the movable plate 41 is not kept in contact with upper portion of the groove 127.

Figure 5:
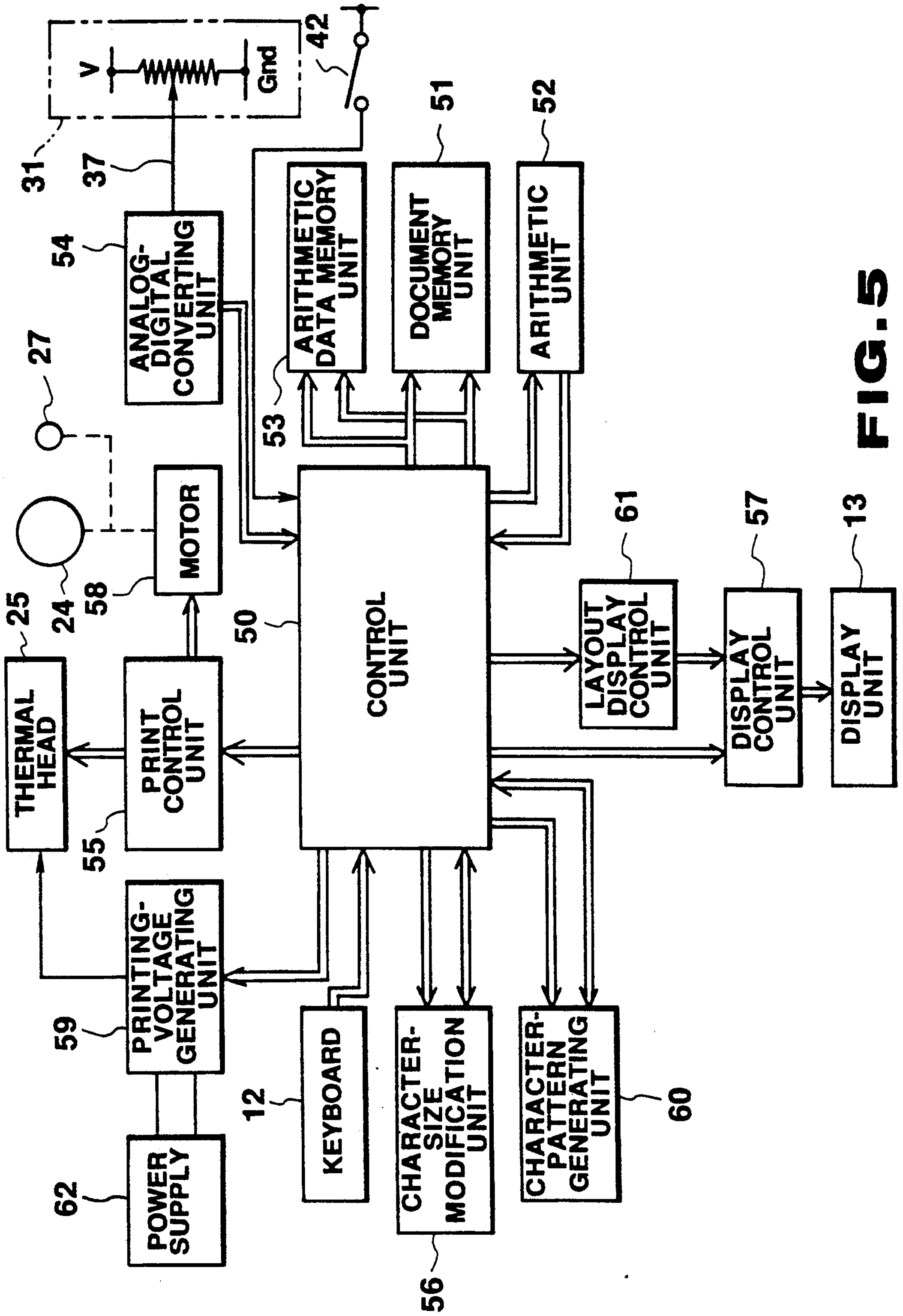
FIG. 5 is a block circuit diagram showing the components of the tape printer illustrated in FIG. 1.

The electronic circuit of the device of the present invention will now be described, with reference to FIG. 5.

Figure 6:
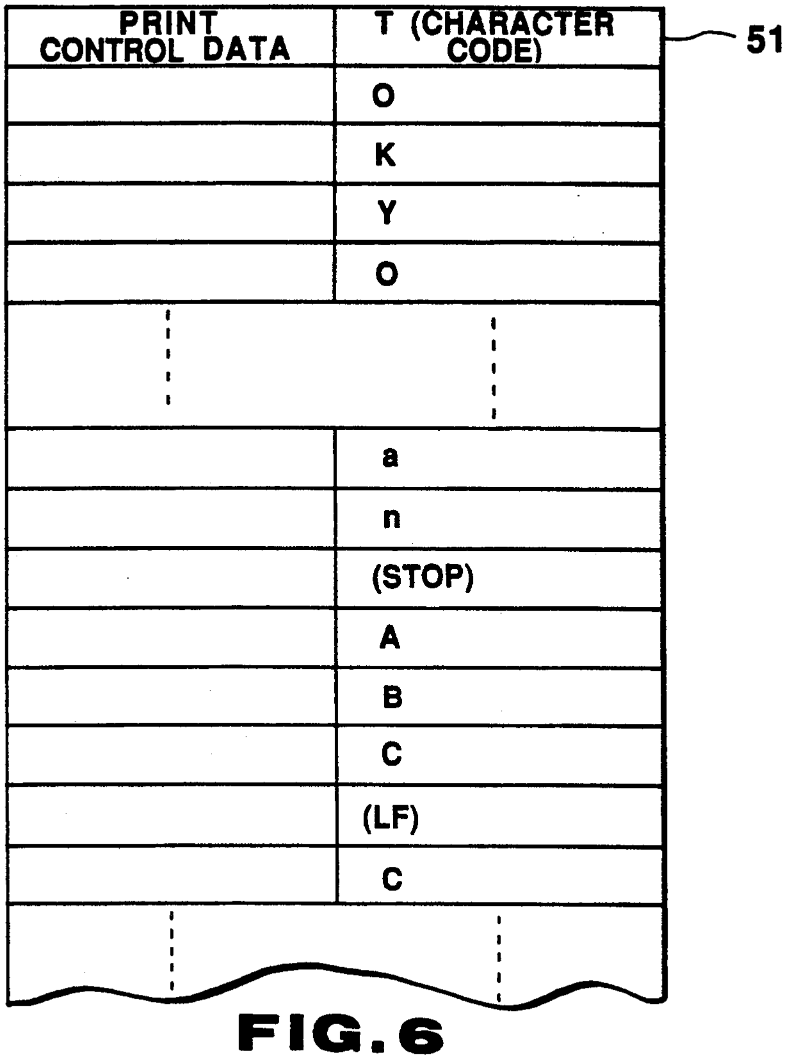
FIG. 6 is a diagram explaining a state of storing data in a document memory unit shown in FIG. 5.

A control unit 50 basically controls and manages the other elements within the block diagram. A keyboard 12 is connected to the control unit 50. The control unit 50 stores alphanumeric data, a line-feed code (LF), a print-stop code (STOP), a character-size code and the like input from the keyboard 12, in a document memory unit 51. As shown in FIG. 6, the document memory unit 51 stores a character code as alphanumeric data, the line-feed code (LF) and the print-stop code (STOP) which are stored as a pair with print-control data including the character-size code.

Figure 7:
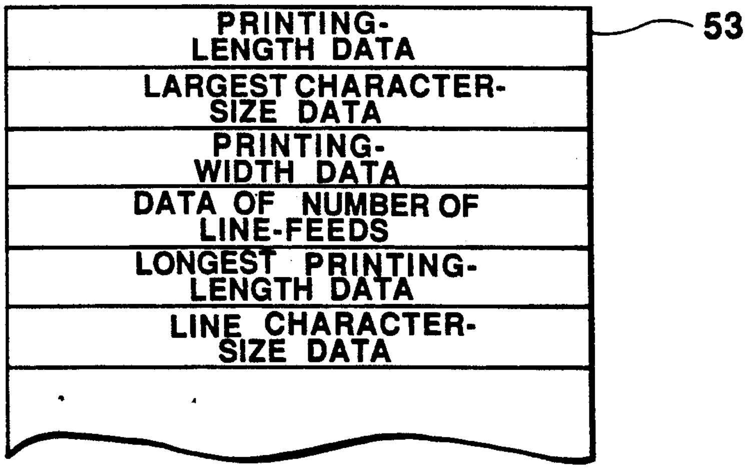
FIG. 7 is a diagram explaining a state of storing data in an arithmetic data memory unit shown in FIG. 5.

An arithmetic unit 52 and arithmetic data memory unit 53 are connected to the control unit 50. The arithmetic unit 52 is supplied with data stored in the document memory unit 51 under the control of the control unit 50 and calculates printing length, printing width, the number of line feeds, the largest character-size or the like based on the print-stop code (STOP), the line-feed code (LF) and character-size code supplied from the document memory unit 51. Also, the arithmetic unit 52 is supplied with tape-width data from the tape-width detecting unit 31 under the control of the control unit 50, and judges whether or not the tape width is wider than the printing width. The arithmetic data memory unit 53 stores printing-length data, the largest character-size data, printing-width data, the data of the number of line feeds, the longest printing-length data, line character-size data representing the largest character-size with respect to each line, and the like, calculated by the arithmetic unit 52, as shown FIG. 7.

On the other hand, the lead 37 of the tape-width detecting unit 31 is connected to an analog-digital converting unit 54. The analog-digital converting unit 54 outputs digital data which has a value corresponding to the value of the voltage supplied from the lead 37, to the control unit 50. Then, the control unit 50 outputs control data to a print control unit 55, a character-size modification unit 56, a display control unit 57 and the arithmetic unit 52 in response to the digital data output from the analog-digital converting unit 54.

The print control unit 55 controls the printing operation of the thermal head 25 based on print data and the control data output from the control unit 50 and controls the drive of the motor 58 for making the platen roller 24 and the ribbon take-up shaft 27 rotate corresponding to the printing operation of the thermal head 25.

Figure 8:
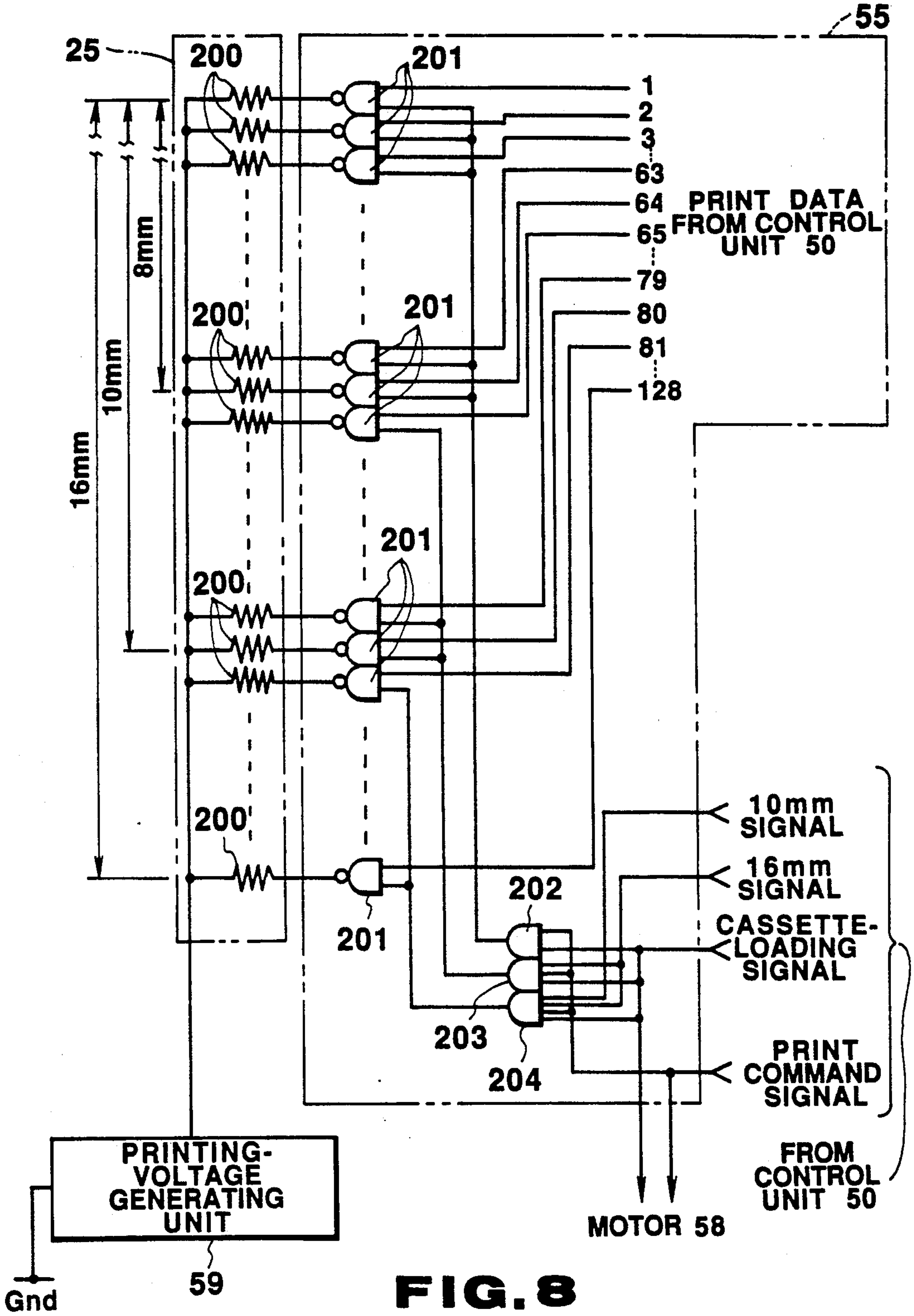
FIG. 8 is a circuit diagram illustrating a part of a circuit for a thermal head, a printing control unit and a printing voltage generating unit shown in FIG. 5.

FIG. 8 shows a part of a detailed circuit of the print control unit 55 and the thermal head 25. In the thermal head 25, which comprises a large number of heating elements 200, 128 of the heating elements 200 are arranged and regularly spaced over a length of 16 mm. Each heating element 200 is connected to a print-voltage generating unit 59 at one end thereof and to a NAND gate 201 provided in the print control unit 55 at other end thereof, respectively. The NAND gates 201 are supplied with print data from the control unit 50 via a print data buffer (not shown) provided in the print control unit 55. The NAND gates 201 respectively connected to the first to 64th heating elements 200, which are arranged over an 8 mm length, are connected to an output terminal of an AND gate 202 provided in the print control unit 55. The NAND gates 201 connected to each of the 65th to 80th heating elements 200, which are arranged between 8 mm and 10 mm distance, are connected to an output terminal of an AND gate 203 provided in the print control unit 55. Furthermore, the NAND gates 201 connected to each of the 81th to 128th heating elements 200, which are arranged between 10 mm and 16 mm distances, are connected to an output terminal of an AND gate 204 provided in the print control unit 55. Each of AND gates 202, 203 and 204 is supplied with a print command signal for instructing the printing operation and a cassette-loading signal indicating that the cassette 100 (120) has been loaded in the printer unit 22, from the control unit 50, respectively. The AND gates 203 and 204 are supplied with a "16 mm" signal indicating that the cassette 100 accommodating a 16 mm wide adhesive tape 101 has been loaded in the printer unit 22, from the control unit 50, respectively. The AND gate 204 is supplied with a "10 mm" signal indicating that the cassette 100 accommodating a 10 mm wide adhesive tape 101 has been loaded in the printer unit 22, from the control unit 50. Also, the print command signal and the cassette-loading signal are supplied to the motor 58 via the print control unit 55, as motor control signals.

The character-size modification unit 56 modifies a character-pattern generated by a character pattern generating unit 60 based on the character code stored in the document memory unit 51, to a character size corresponding to the control data supplied from the control unit 50 thereto (i.e., to a character size corresponding to the width of the loaded tape).

The display control unit 57 controls the display operation of the display unit 13 based on display data and the control data output from the control unit 50 and layout display data output from a layout display control unit 61. The layout display control unit 61 produces the layout display data based on the data of the number of line-feeds and the line character-size data obtained by the arithmetic unit 51.

Various operations of the tape printer with the above-described arrangement will now be described.

First, the tape printer of this embodiment is capable of being loaded with the cassette 100 or 120 providing adhesive tapes 101 or 121 which are 16 mm, 10 mm or 8 mm wide. When the cassette 100 or 120 is loaded into the printer unit 22, the height adjust pins 30 mounted on the chassis 23 of the printer unit 22 are inserted into the height adjust holes 106 or are kept in contact with the lower surface of the cassette case 126. Then, when the cassette 100 or 120 has been completely loaded into the printer unit 22, the lower surface of the cassette case 108 or 128 is at a predetermined position according to the width of the adhesive tape 101 or 121 provided in the cassette case 108 or 128. In this state, the movable plate 35 of the tape-width detecting unit 31 is rotated in response to the position of the lower surface of the cassette case 108 or 128 and outputs a voltage having a value corresponding to the position of the resistor plate 36 with which the movable plate 35 is kept in contact, to analog-digital converting unit 54 via the lead 37.

The movable plate 41 of the ink-material detecting unit 32 is inserted into the groove 107 or 127 formed on the cassette case 108 or 128. In the case of an ink ribbon 102 being made of a high melting point ink provided in the loaded cassette case 108, the movable plate 41 is rotated with the upper portion of the groove 107 and turns the microswitch 42 on. Conversely, in the case of an ink ribbon 122 being made of a low melting point ink, being provided in the cassette case 128 loaded in the printer unit 22, the movable plate 41 is not kept in contact with the upper portion of the groove 127 and keeps the microswitch 42 in the turned off state. Then, the microswitch 42 outputs an on/off signal to the control unit 50.

The alphanumeric data input from the keyboard 12 is stored in the document memory unit 51 and is displayed on the display unit 13 under the control of the control unit 50. The print control data, such as a character-size code input from the keyboard 12 is also stored in the document memory unit 51. Furthermore, the line-feed code (LF) and print-stop code (STOP) input from the keyboard 12 are also stored in the document memory unit 51.

Figure 9:
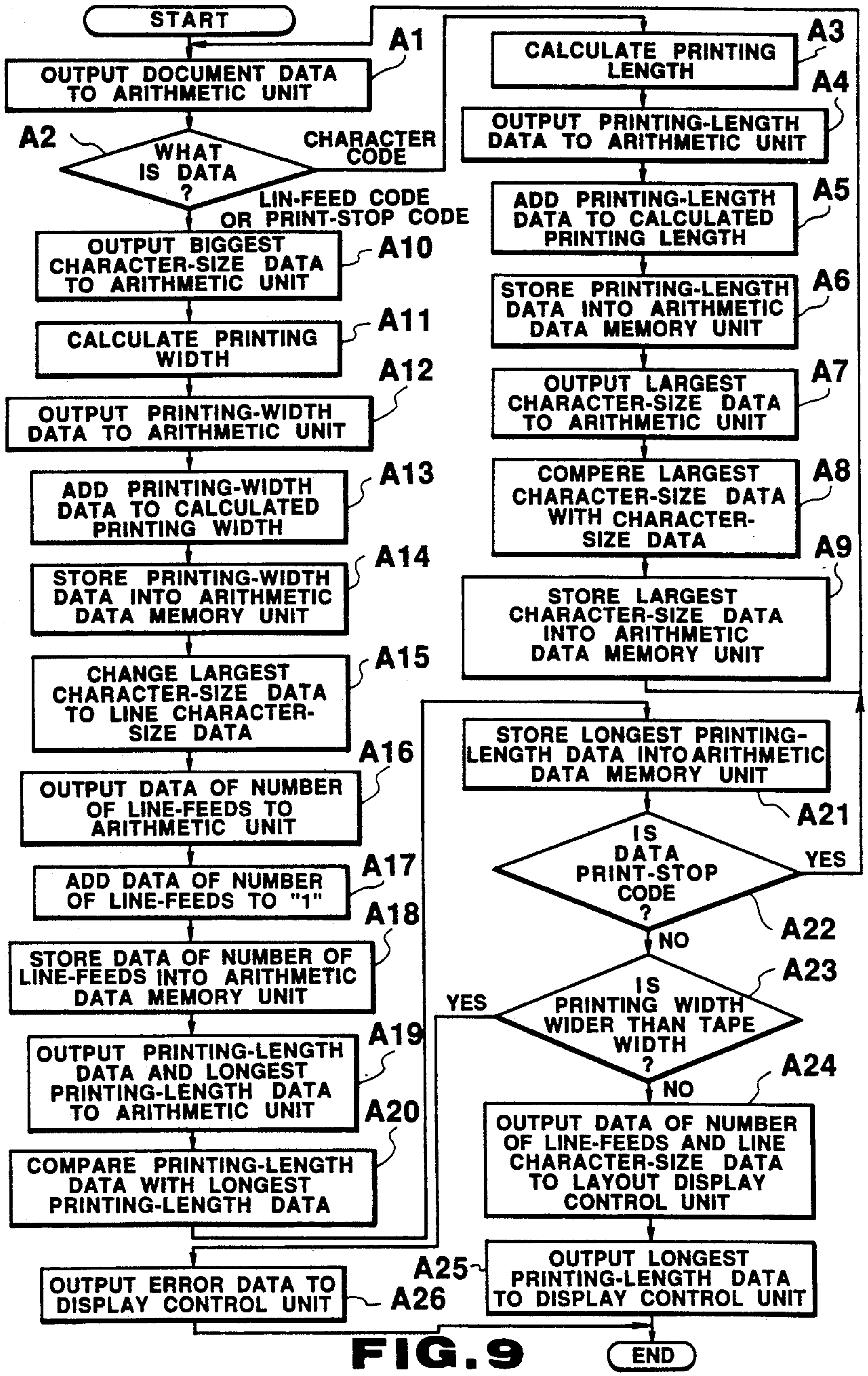
FIG. 9 is a flow chart for explaining processing operations when a printing mode is designated.

The print mode processes will be described with reference to the flow chart shown in FIG. 9.

First, when the print mode is designated by the keyboard unit 12, the control unit 50 outputs the document data which includes data indicated by a cursor on the display unit 13 and is stored between two print-stop codes (STOP) in the document memory unit 51, from the document memory unit 51 to the arithmetic unit 52 (STEP Al). The arithmetic unit 52 judges that the document data output from the document memory unit 51 is the character data or either the line-feed code (LF) or the print-stop code (STOP) (STEP A2). When the document data is the character data, the arithmetic unit 52 calculates the printing length based on the character-size data made as a pair with the character data (STEP A3). Furthermore, the arithmetic unit 52 adds the calculated printing length to printing-length data output from the arithmetic data memory unit 53 under the control of the control unit 50 (STEPS A4 and A5). Then, the printing-length data updated by the arithmetic unit 52 is stored in the arithmetic data memory unit 53 under the control of the control unit 50 (STEP A6).

Also, the arithmetic unit 52 compares the character-size data output from the document memory unit 51 with the largest character-size data output from the arithmetic data memory unit 53 with respect to direction of the printing width, i.e. printing character height (STEPS A7 and A8). The larger one of character-size data and the largest character-size data which is judged by the comparison operation, is stored in the arithmetic data memory unit 53, as the largest character-size data, under the control of the control unit 50 (STEP A9). In the above-described process, the printing length data and the largest character-size data stored in the arithmetic data memory unit 53 have been cleared before the first character data for being judged in STEP Al, outputs from the document memory unit 51.

Hence, the printing-length data and the largest character-size data with respect to one line are obtained by repeating the processes from STEP A3 to STEP A9 for character data continuously output from the document memory unit 51 until the line-feed code (LF) or the print-stop code (STOP) is judged in STEP A2.

On the other hand, when the document data output from the document memory unit 51 is either the line-feed code (LF) or the print-stop code (STOP), the control unit 50 transfers the largest character-size data from the arithmetic data memory unit 53 to the arithmetic unit 52 (STEP A10). Then, the arithmetic unit 52 calculates the printing width based on the largest character-size data (STEP All). The arithmetic unit 52 adds the calculated printing width to the printing-width data output from the arithmetic data memory unit 53 under the control of the control unit 50 (STEPS A12 and A13). Then, the printing-width data updated by the arithmetic unit 52 is stored in the arithmetic data memory unit 53 (STEP A14). The largest character-size data which has been stored in the arithmetic data memory unit 53 is stored, as the line character-size data representing the largest character-size with respect to one line, in the arithmetic data memory unit 53 and is cleared (STEP A15). The data of the number of the line-feeds is output from the arithmetic data memory unit 53 to the arithmetic unit 52 (STEP A16). The arithmetic unit 52 adds the data of the number of the line-feed data with "1" (STEP A17). The data of the number of the line-feed data updated by the arithmetic unit 52 is stored in the arithmetic data memory unit 53 (STEP A 18). Thereafter, the control unit 50 supplies the printing-length data and the longest printing-length data stored in the arithmetic memory unit 53 to the arithmetic unit 52 (STEP A19). The arithmetic unit 52 compares the printing-length data with the longest printing-length data and judges (i.e., determines) the larger one (STEP A20). The larger data judged by the arithmetic unit 52 is stored in the arithmetic data memory unit 53, as the longest printing-length data (STEP A22), and the printing-length data which has been stored in the arithmetic data memory unit 53 is cleared. In the above-described process, the printing-width data, the data of the number of line-feeds and the longest printing-length data stored in the arithmetic memory unit 53 have been cleared before the first judgment of either the line-feed code (LF) or the print-stop code (STOP) is performed in STEP A2.

The processes based on STEPS A10 to A21, obtain the printing-width and the number of the line-feeds with respect to all document data to be printed, the largest character-size with respect to each line of all document data to be printed, and the longest printing-length among the printing-lengths of each line of all document data to be printed.

Thereafter, the arithmetic unit 52 judges whether or not the document data which has been subjected to the above-described processes is the print-stop code (STOP) (STEP A22). If the judgment is "No", i.e. the data is the line-feed code (LF), the control unit 50 reads-out the document data from the document memory unit 51, again (STEP Al). Conversely, if the judgment is "Yes", i.e. the data is the print-stop code (STOP), the control unit 50 supplies the tape-width data from the analog-digital converting unit 54 and the printing-width data from the arithmetic data memory unit 53, to the arithmetic unit 52. The arithmetic unit 52 compares the tape-width data with the printing-width data and judges which is the larger one (STEP A23). If the tape-width data is larger than the printing-width, the control unit 50 supplies the data of the number of line-feeds and the line character-size data from the arithmetic data memory unit 53 to the layout display control unit 61 (STEP A24), and the longest printing-length data from the arithmetic data memory unit 53 to display control unit 57 (STEP A25). The layout display control unit 61 produces the layout display data having lines which are corresponding in number to the number of line-feed data and thickness corresponding to the line character-size data.

Conversely, if the printing-width data is larger than the tape-width data, the control unit 50 supplies error data to the display control unit 57 (STEP A26).

FIGS. 10A-10E show the display conditions of the display unit 13 when the above-described process is being carried out. In this situation, character size [1×1] is the actual printing area [4 mm×4 mm] including the space between two printing characters.

The display condition shown in FIG. 10A is obtained when the document data "ABC CO., LTD. Japan (STOP)" which is composed of the document data "ABC CO., LTD." designated with the character size [1×1] and the document data "Japan" designated with the character-size [2×2], is designated as the data to be printed. In this example, a cassette 100 having a 16 mm wide adhesive tape 101 is loaded in the printer unit 22. First, the control unit 50 produces display data [16 mm] based on the tape-width data obtained from the analog-digital converting unit 54 and outputs the display data [16 mm] to the display control unit 57. Thereafter, the control unit 50 outputs display data [1×1] corresponding to the character-size data with respect to the character data designated by the cursor, to the display control unit 57. Furthermore, the control unit 50 outputs display data [9.6 cm] corresponding to the longest printing-length data obtained by a process based on the flow chart shown in FIG. 9, to the display control unit 57, and the data of the number of line-feed data [1] and the line character-size data [2×2] obtained in the same way, to the layout display control unit 61. The layout display control unit 61 produces and outputs layout display data having one line having a character thickness corresponding to the line character-size data [2×2] to the display control unit 57. The display unit 13 displays the character size [1×1], the longest printing length [9.6 cm], tape width [16 mm] and the layout data from left side to right side on the upper portion thereof under the control of the display control unit 57.

The display condition shown in FIG. 10B is obtained when the document data "ABC (LF) CO., LTD. Japan (STOP)" is designated as data to be printed, and other conditions are the same as those of FIG. 10A. The designation "(LF)" denotes "line-feed". In this case, the longest printing length is 8.0 cm.

The display condition shown in FIG. 10C is obtained when the document data "ABC (LF) CO., LTD. (LF) Japan (STOP)" is designated as data to be printed, and other conditions are the same as those of FIG. 10A. In this case, the longest printing length is 3.6 cm.

The display condition shown in FIG. 10D is obtained when the document data "ABC (LF) CO., LTD. Ja (LF) pan (STOP)" is designated as data to be printed, and other conditions are the same as those of FIG. 10A. In this case, the printing width is 24 mm, which is wider than the tape width of 16 mm. Therefore, the control unit 50 outputs the error data to display control unit 57. Then, the display unit 13 displays [Err] instead of the layout display data under the control of the display control unit 57.

The display condition shown in FIG. 10E is obtained when the document data "ABC (LF) CO., LTD. (LF) Japan (STOP)" which is composed of the document data "ABC CO., LTD." designated with the character size [1×1] and the document data "Japan" designated with the character-size [2×2], is designated as the data to be printed, and a cassette 120 having an 8 mm wide adhesive tape 121 is loaded in the printer unit 22. In this case, the printing width is 16 mm which is wider than the tape width of 8 mm. Therefore, the control unit 50 outputs the error data to display control unit 57. Then, the display unit 13 displays [Err] instead of the layout display data under the control of the display control unit 57.

The printing operation will now be described.

When the print-start command is input from the keyboard 12, the control unit 50 outputs the cassette-loading signal and the 16 mm signal, 10 mm signal or no signal corresponding to the tape-width data obtained by analog-digital converting unit 54, to the print control unit 55. Also, the control unit 50 outputs the control data in response to the on/off signal output from the microswitch 42, to the printing-voltage generating unit 59. Thereafter, the control unit 50 supplies the character code from the document memory unit 51 to the character-pattern generating unit 60, so as to obtain the character-pattern data. The character-pattern data is provided to the character-size modification unit 56 and is modified to a desired character-size based on the character-size data under the control of the control unit 50. Then, the modified character-pattern data is supplied to the print control unit 55. The print control unit 55 controls the heating operating of the thermal head 25 and the rotation of the motor 58, based on the data output from the control unit 50. The thermal head 25 prints the character pattern on the adhesive tape 101 or 121 by transferring the heat melt ink from the ink ribbon 102 or 122 to the surface of the adhesive tape 101 or 121. The motor 58 makes the platen roller 24 and the ribbon take-up shaft 27 rotate, so as to transfer the adhesive tape 101 or 121 and the ink ribbon 102 or 122 to the head insert portion provided to the cassette case 108 or 128. Thereafter, the printed adhesive tape 101 or 121 is fed out from the outlet 17 to the outside of the case 11.

FIGS. 11A–11E show the printed adhesive tapes 101 and 121 printed under conditions which are the same as those of each of FIGS 10A–10E, respectively.

In the case of FIGS 11A–11D, since the cassette 100 having the adhesive tape 101 of 16 mm width is loaded in the printer unit 22, the control unit 50 provides the 16 mm signal and the cassette-loading signal to the print control unit 55. In the case of FIG. 11E, since the cassette 120 having the adhesive tape 121 of 8 mm width is loaded in the printer unit 22, the control unit 50 provides only the cassette-loading signal to the print control unit 55.

In the case of FIGS. 11D and 11E, the control unit 50 supplies the character-pattern data with respect to the line out of the printing area of the adhesive tape 101 or 121, to the print control unit 55 after the character-pattern data of the lines within the printing area of the adhesive tape 101 or 121 has been printed.

Figure 12:
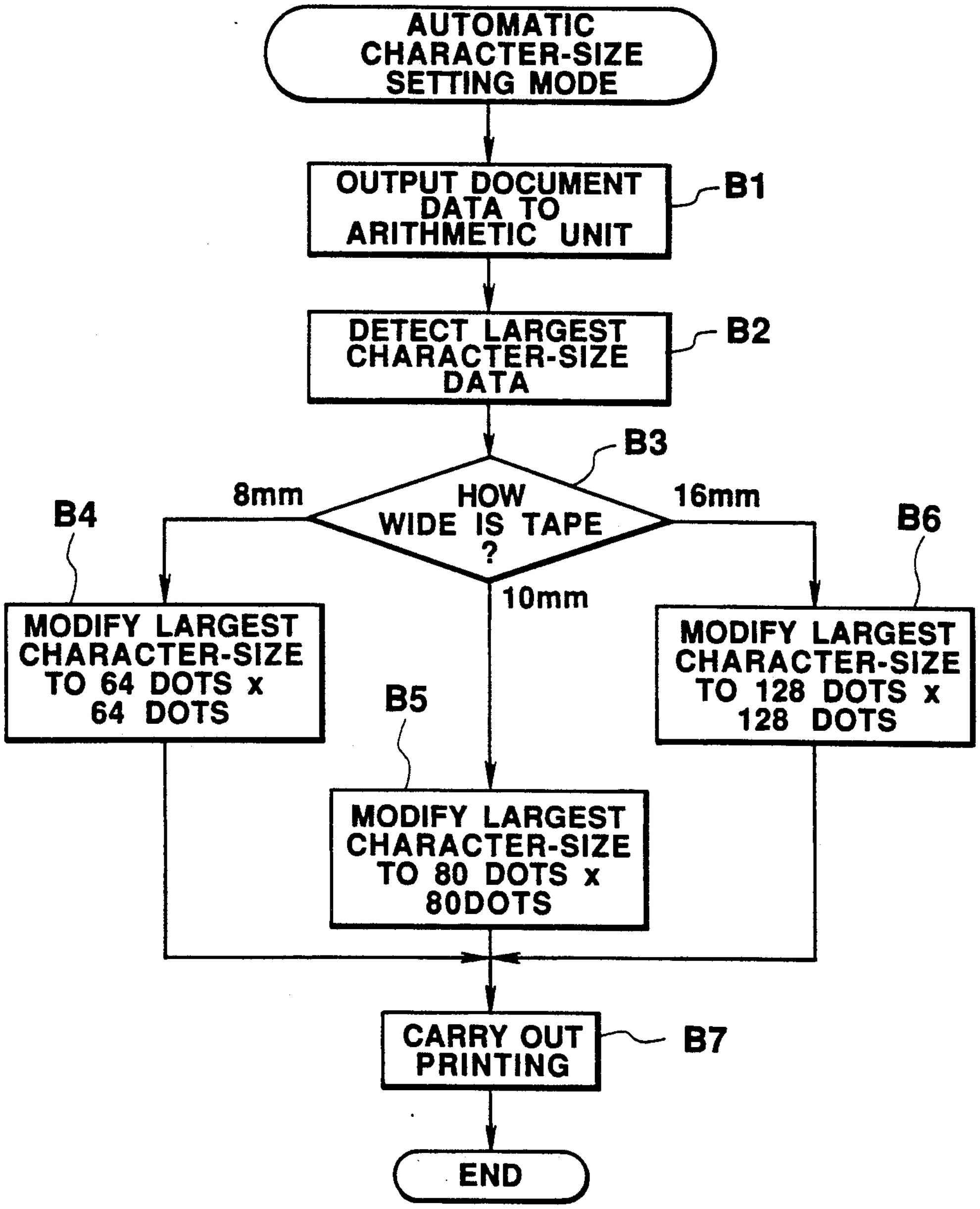
FIG. 12 is a flow chart for explaining processing operations when an automatic character-size setting mode is designated.

The automatic character-size setting mode process will now be described with reference to the flow chart shown in FIG. 12.

First, the control unit 50 supplies the document data from the document memory unit 51 to the arithmetic unit 52 when the automatic character-size setting mode is designated by the keyboard 12 (STEP B1). The arithmetic unit 52 judges the largest character-size from the character-size data output from the document memory unit 51 (STEP B2). The control unit 50 also supplies the tape-width data from analog-digital converting unit 54 to the arithmetic unit 52. Then, the arithmetic unit 52 judges the width of the adhesive tape 101 or 121 is (STEP B3). If the adhesive tape is 8 mm wide, the control unit 50 controls the character-size modification unit 56, so as to modify the largest character-size pattern to be the character pattern having 64 dots×64 dots (STEP B4). If the adhesive tape is 10 mm width, the control unit 50 controls the character-size modification unit 56, so as to modify the largest character-size pattern to be the character pattern having 96 dots×96 dots (STEP B5). If the adhesive tape is 16 mm width, the control unit 50 controls the character-size modification unit 56, so as to modify the largest character-size pattern to be the character pattern having 128 dots×128 dots (STEP B6).

FIGS. 13A–13C show the printed adhesive tape 101 or 121 printed based on above-described process.

The document data "TOKYO JAPAN (STOP)" to be printed is composed of the document data "TOKYO" designated with the character-size [2×2] and the document data "JAPAN" designated with the character-size [1×1]. In the case of FIG. 13A, since the adhesive tape is 8 mm wide, the document data "TOKYO" is modified to be the character pattern having 64 dots×64 dots. Accordingly, the document data "JAPAN" is modified to be the character pattern having 32 dots×32 dots. In the case of FIG. 13B, since the adhesive tape is 10 mm wide, the document data "TOKYO" is modified to be the character pattern having 80 dots×80 dots and the document data "JAPAN" is modified to be that of 40 dots ×40 dots. In the case of FIG. 13A, since the adhesive tape is 16 mm wide, the document data "TOKYO" is modified to be the character pattern having 128 dots×128 dots and the document data "JAPAN" is modified to be that of 64 dots×64 dots.

As described above, since the character pattern data is automatically modified based on the width of the adhesive tape provided in the cassette which is loading into the printer unit, the character-size data does not have to be manually modified every time the cassette is changed.

What is claimed is:

1. A tape printer on which at least one of a plurality of tapes each having a different tape-width is selectively installed, comprising:
   - a printer housing;
   - data input means for inputting character data representative of characters to be printed, said character data including printing-width data for relating the characters proportionally in size to a tape width, but not including any specific printing size;
   - a tape member adapted to be installed on said printer housing and having a tape width selected from among the plurality of tapes each having a different tape-width;
   - printing means provided in said printer housing, for printing on said tape member the characters represented by said character data input from said data input means;
   - tape-width detecting means provided in said printer housing, for detecting the selected tape-width of said tape member installed on said housing; and
   - printing control means for controlling the printing size of the characters to be printed by said printing means based on the selected tape-width detected by said tape-width detecting means combined with the printing-width data of said character data, so that said printing means prints said characters in an area corresponding to the width of said tape member installed on said printer housing.

2. The tape printer according to claim 1, wherein:
   - said printing means includes a plurality of printing elements arranged in a direction with respect to the width of said tape member; and
   - said printing control means includes means for activating said printing elements which are arranged in range within the tape-width detected by said tape-width detecting means.

3. The tape printer according to claim 1, wherein:

said printing means includes a plurality of printing elements arranged in a direction with respect to the width of said tape member; and said printing control means includes activating means for activating said printing elements and inhibiting means for inhibiting said activating means from activating said printing elements which are arranged out of a range within the tape-width detected by said tape-width detecting means.

4. The tape printer according to claim 1, further comprising:

memory means for storing character data to be printed by said printing means;

printing-width detecting means for detecting said printing-width data with respect to the character data stored in said memory means; and judging means including means for comparing printing size of the characters based on the printing-width data detected by said printing-width detecting means with the tape-width detected by said tape-width detecting means, and means for judging whether or not the characters represented by the character data stored in said memory means can be printed on said given width of said tape member installed on said printer housing.

5. The tape printer according to claim 4, further comprising:

indicating means for indicating whether or not the characters represented by the character data stored in said memory means can be printed on said given width of said tape member installed on said printer housing, based on a result of judgment by said judging means.

6. The tape printer according to claim 1, wherein said printing control means includes printing-size setting means for setting a printing-size with respect to the character data to be printed, in accordance with the tape-width detected by said tape-width detecting means.

7. The tape printer according to claim 6, further comprising:

printing-size designating means for designating a printing-size proportion of the character data to be printed; and wherein said printing-size setting means includes printing-size modifying means for modifying a printing-size proportion designated by said printing-size designating means to be a printing-size corresponding to the tape-width detected said tape-width detecting means.

8. The tape printer according to claim 7, wherein:

said input means includes means for inputting alphanumeric data; and said printing-size designating means includes means for designating a printing-size proportion for each alphanumeric data input from said input means; and said tape printer further comprising:

biggest size detecting means for detecting a biggest printing-size among printing-size proportions designated by said printing-size designating means;

whereby said printing-size modifying means modifies the printing-size proportion designated by said printing-size designating means so that the biggest printing-size detected by said biggest size detecting means corresponds to the tape-width detected by said tape-width detecting means.

9. The tape printer according to claim 1, wherein:

said tape member includes a printing tape having a given width, to have the data printed thereon by said printing means and a cassette case having said printing tape therein and having a cassette thickness which is a function of the width of said printing tape contained therein; and said tape-width detecting means includes means for detecting the thickness of said cassette case, so as to thereby detect the width of said printing tape contained in said cassette case.

10. The tape printer according to claim 9, further comprising:

accommodating means provided in said housing, for removably accommodating said cassette case therein; and adjusting means provided in said accommodating means, for adjusting one of an upper surface and a lower surface of said cassette case to a predetermined position when said cassette case is accommodated in said accommodating means;

and wherein said tape-width detecting means includes means for detecting a position of another of the upper surface and the lower surface of said cassette case when said cassette case is accommodated in said accommodating means.

11. A tape printer on which at least one of a plurality of tape housings each having a tape-width indicating portion and containing a corresponding tape member selected from among a plurality of tape members each having a different tape-width is installed, comprising:

a printer housing;

data input means for inputting character data representative of characters to be printed, said character data including printing-width data for relating the characters proportionally in size to a tape width, but not including any specific printing size;

tape housing receiving means provided in said printer housing for receiving one of the tape housings;

printing means provided in said printer housing, for printing on the tape member contained in the tape housing received in said tape housing receiving means data input from said data input means;

tape-width detecting means provided in said printer housing, for detecting the selected tape-width of the tape member contained in the tape housing received in said tape housing receiving means, by sensing the tape-width indicating portion of said tape housing; and printing control means, for controlling the printing size of the characters to be printed by said printing means based on the selected tape-width detected by said tape-width detecting means combined with the printing-width data of said character data, so that said printing means prints said characters in an area corresponding to the selected tape-width of said tape member received in the tape housing received in said tape housing receiving means.

12. The tape printer according to claim 11, wherein said printing means includes a plurality of printing elements arranged in a direction with respect to the width of said tape member; and said printing control means includes means for activating said printing elements which are arranged in a range within the tape-width detected by said tape-width detecting means.

13. The tape printer according to claim 11, wherein said printing means includes a plurality of printing elements arranged in a direction with respect to the width of said tape member; and said printing control means includes activating means for activating said printing elements, and inhibiting means for inhibiting that said activating means activates said printing elements which are arranged out of a range within the tape width detected by said tape-width detecting means.

14. The tape printer according to claim 11, further comprising:

memory means for storing the character data to be printed by said printing means;

printing-width detecting means for detecting said printing width data with respect to the character data stored in said memory means; and judging means for comparing printing size of the characters based on the printing-width detected by said printing-width data detecting means with the tape-width detected by said tape-width detecting means and judging whether or not the characters represented by the character data stored in said memory means can be printed on said tape member received in the tape housing in said printer housing.

15. The tape printer according to claim 14, further comprising:

indicating means for indicating whether or not the characters represented by the character data stored in said memory means can be printed on said tape member received in the tape housing in said printer housing, based on a result of judgment by said judging means.

* * * * *